Dec. 1, 1942.   O. B. JOHNSTON   2,303,472
GRAPHIC RECORDER
Filed May 5, 1941   2 Sheets-Sheet 1

INVENTOR
Orin B. Johnston
BY
ATTORNEY

Patented Dec. 1, 1942

2,303,472

UNITED STATES PATENT OFFICE 2,303,472

GRAPHIC RECORDER

Orin B. Johnston, Seattle, Wash.

Application May 5, 1941, Serial No. 392,025

2 Claims. (Cl. 234—64)

This invention relates to a graphic recorder. More particularly, this invention relates to a graphic recorder which may be used in combination with any device having a hand or hands to indicate graphically periodic positions of said hand or hands.

Graphic instruments ordinarily employ a stylus or pen with an ink supply and move laterally of a chart which is longitudinally moved or rotated. Such types of graphic instruments have many shortcomings. One shortcoming relates to the friction of the stylus or pen on the paper limiting the accuracy of the recorder. Also such types of instruments are generally "dampened" to a very material extent or a legible graphic chart will not be produced. Also graphic recording instruments using the ordinary pin or stylus with an ink supply must be used in places having minimum vibrations, jarring, etc., or inaccurate operation or no operation at all will result.

In fields where moving vehicles carry graphic recording instruments as airplanes, ships, trains, and the like, the provision of graphic recorders results in considerable difficulties to provide for accuracy of instrument and at the same time a legible graph. It is an object of the present invention to provide a graphic recorder which does not add "load" to the moving needle and thereby interfere with the accuracy of the instrument. In most instruments the power available to operate the needle is very limited if the needle is to accurately record slight variations. Therefore any load added to the needle will interfere with the accuracy of the instrument.

It is a further object of the invention to provide devices operating in spaced relation to and electrically communicating with the needle of an instrument.

It is a further object of the invention to provide a graphic recorder which will provide a chart which may be read at all times so that the recorded information is available when and as desired.

It is a further object of the invention to provide a graphic recorder which will provide graphically the values represented by the needle of an instrument and on readily available economical paper charts.

The above mentioned general objects of my invention, together with others inherent in the same, are attained by the device illustrated in the following drawings, the same being preferred exemplary forms of embodiment of my invention, throughout which drawings like reference numerals indicated like parts:

Figures 1, 2, 3, 4:
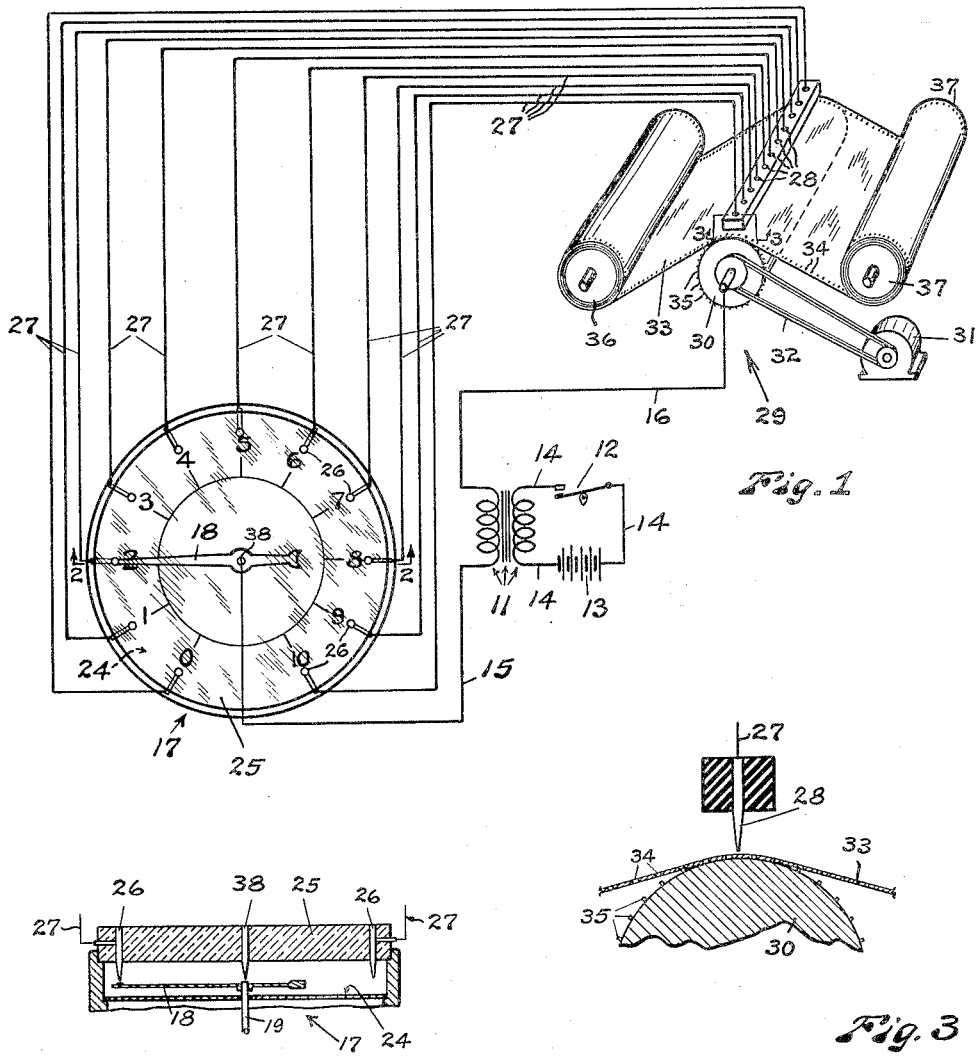
Figure 1 is a somewhat schematic view with parts shown in perspective showing the present invention used in connection with an instrument having a single hand or needle.
Fig. 2 is a view in section taken substantially on broken line 2—2 of Fig. 1.
Fig. 3 is a sectional view taken substantially on broken line 3—3 of Fig. 1 and on a larger scale than the similar parts in Fig. 1 and with parts broken away.
Fig. 4 is a view similar to Fig. 2 of an alternative form of the invention.

Referring to Figs. 1 and 2 of the drawings, a spark coil 11, breaker 12 and battery 13 are connected in the usual manner by conductor 14. This is one manner of impressing on conductors 15 and 16 a high voltage low amperage E. M. F. In this connection, the use of a spark coil 11, breaker 12 and source of energy as battery 13 is to be understood as only illustrative of one common way of providing such E. M. F. on conductors 15 and 16. The E. M. F. to be impressed or induced on conductors 15 and 16 is of the nature of the E. M. F. commonly used for ignition purposes on internal combustion engines and any well known manner of providing such E. M. F. on conductors 15 and 16 may be employed.

The instrument designated generally by 17 in Figs. 1 and 2 is provided with an indicating needle 18. As the invention is applicable to the various instruments provided with an indicating needle, the operating means for moving the shaft 19 and in turn the needle 18 is not shown. The shaft 19 of the needle shown in Figs. 1 and 2 is preferably formed of insulating material. An alternative form of construction is shown in Fig. 4 where the needle 20 and shaft 21 are formed of usual material which may be either electrically conducting or electrically non-conducting material as chosen by the instrument manufacturer. In said Fig. 4 an auxiliary metallic needle 22 is supported by insulating pieces 23 to provide an insulated metallic needle 22 movable with the ordinary needle 20 of the instrument. In other words, the needle 18 of the instrument as shown in Figs. 1 and 2 is a metallic needle and preferably insulated from the rest of the instrument by reason of the character of the shaft 19, and in Fig. 4 a needle 22 is provided which is a metallic needle and is likewise insulated from the remainder of the instrument. It is necessary that a needle 18 or 22 be formed of metal. It is preferable that such needle be insulated from the remainder of the instrument so that there can be no spark jumping within the instrument proper.

The dial face of an instrument to which this invention is to be used is numbered 24 and has the usual indicia thereon as 0 to 10 as shown in Figure 1. The usual glass crystal through which the dial face and needles may be seen is replaced by a disc-like member 25, hereafter described. There need be no change made in the instrument to which this invention is applied except the substitution of said disc-like member and providing either the insulated shaft 19 of Fig. 2 or the auxiliary needle 22 of Fig. 3.

The disc-like member 25 is formed of insulating material and is preferably transparent so that the dial face 24 and the needle 18 or 20—22 may be observed. A plurality of electrodes 26 are provided in a circular path in such disc 25. The electrodes 26 have their lower end portions in a common plane which is in relatively close spaced relation to the path of travel of the needle 18 or needle 22. Also the lower portions of such electrodes 26 may be flush with the lower surface of the disc 25 or projecting therebelow, as shown, so long as the desired spaced relation to the needle is maintained. The electrodes 26 preferably have their lower portions of reduced cross-sectional area and of semi-spherical shape. Standard phonograph needles having a rounded point portion of approximately 2/1000 of an inch have been found to be very satisfactory to use as electrodes 26. The gap between the lower portions of the electrodes 26 and the needle 18 or 22 should be reduced to the minimum required for clearance in the interests of accuracy. If a space is provided such as 1/1000 of an inch, this will be sufficient to allow for expansion and contraction and eliminate any possibility of friction between the needle 18 or 22 and the electrodes 26. The space to be provided between the needle 18 or 22 and the electrodes 26 will be determined by the particular instrument involved and factors, as the trueness of the needle and the possibility of end play of a particular needle.

A plurality of conductors 27 respectively connect electrodes 26 and electrodes 28 of the recording device numbered generally 29 in Figure 1. This recording device comprises metallic platen 30, which is here shown by way of illustration as a rotatably mounted cylinder, and is connected to a timing device, as motor 31. Any of the usual timing devices may be employed and by way of illustration a motor 31 is shown connected by belt means 32 to the cylinder or platen 30. The conductor 16 is connected to the platen 30. A paper chart 33 having the desired calibrating indicia thereon is fed between platen 30 and electrodes 28. This may be accomplished by using paper 33 with perforations 34 meshing with toothed portions 35 carried by platen 30 and providing a feed roll 36 and a take up roll 37. The paper chart 33 may be of any desired material. I have found that vellum or draftsman's tracing paper is a very suitable material as the same may be pierced by the spark providing a suitable indicating hole in the paper. As this material does not tend to char or burn, a very desirable graphic chart may be provided on such paper. The paper chart 33 may be endless on a disc or the strip passing over a platen, as shown. The electrodes 28 are in spaced relation to the platen 30. The distance of the spacing here provided should again be the minimum permitted to prevent friction between the electrodes 28 and the paper chart 33.

The recording device 29 is illustrative of a device which is operated or controlled by the energy on conductors 27. It it to be expressly understood that such device is not a limitation of my invention but is merely illustrative of one form of a device operated or controlled by the energy on such conductors. Obviously many types of devices may be employed either in connection with the devices of Figs. 1 to 4 or the device of Figs. 5 and 6 and be operated or controlled directly or indirectly (as by relay devices) thereby.

Figure 5:
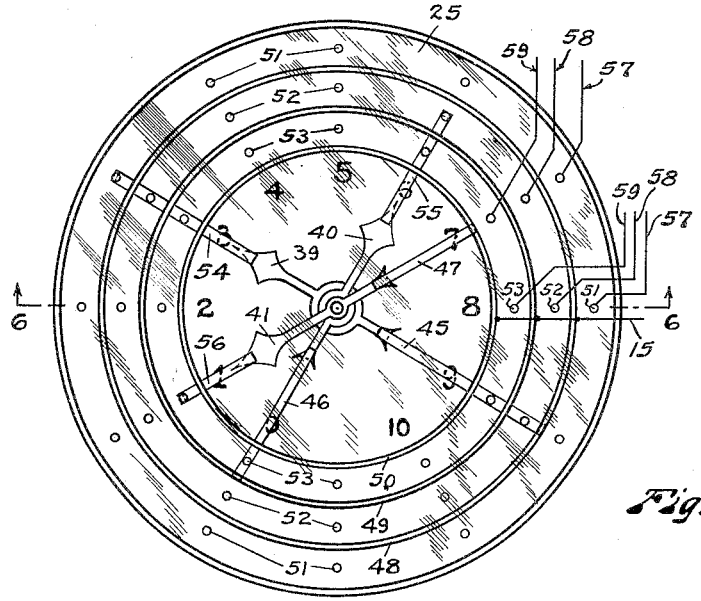
Fig. 5 is a plan view showing the present invention used in connection with an instrument having a plurality of hands or needles.

The conductor 15 connects with electrode 38, shown in Figs. 1, 2 and 3 as centrally disposed in the disc-like member 25. The lower end portion of the electrode 38 is in spaced relation to the needle 18 or 22 similar to the spacing of the electrodes 26 to said needle. An alternative manner of electrically connecting the conductor 15 to a needle is shown in Figs. 4 and 5 where annular rings are employed as will be hereinafter discussed.

The electrical energy on conductor 15 is connected to electrode 38. The energy will jump from the electrode 38 across the air gap and to the needle 18 or 22. The energy on needle 18 will jump from such needle to an electrode 26 depending upon the position of the needle. Energy reaching an electrode 26 will pass by one of the conductors 27 (again depending upon the position of the needle), and travel to one of the electrodes 28. Thence the energy will pierce the paper 33 and pass to the platen 30, thence to conductor 16, thence through spark coil 11 and completing the circuit to conductor 15.

It is to be noted in the above description that the electrical energy from the spark coil 11 passes through three air gaps. In actual practice it has been found that three air gaps may be employed and at the same time the resistance of the circuit is such that a great number of electrodes 26 may be used without the electrical energy jumping between electrodes 26. In this connection it is to be remembered that eleven electrodes 26 are shown only by way of illustration. Also it has been found that presently available insulated wire may be used for conductors 27 without short-circuiting or spark jumping occurring in the cable containing such conductors. I have also found in a practical device that an instrument having a 5" diameter can be used in connection with this invention with approximately one hundred and twenty electrodes without spark jumping between electrodes. The reduced or minimum air gaps, as well as the fineness or narrow cross section area of the spark by reason of the reduced points of electrodes, all tend to reduce the resistance of the circuit so that the resistance of the circuit along a desired conductor is less than the resistance between electrodes and hence the absence of spark jumping at undesirable places.

It is also important to note in the foregoing invention that the disc-like member 25 is stationary and that no moving parts are added to the instrument to add "load" to the needle of the device.

Preferably the disc-like member 25 is formed of a transparent plastic insulating material so as not to interfere with observation of the needles 18 or 22 and the dial face 24. There are many transparent plastic insulating materials which may be readily obtained on the market, and which are sold under various trade names as "Amphenol," "Plexi-glass," and "Lucite." It is thus apparent that any instrument having a recording needle may be adapted to the present invention by merely replacing the usual glass cover with a disc-like member 25. The proper spacing between the electrodes 26 and 38 and the needle 18 or 22 obviously may be readily provided for by the size and depth of said member 25 to fit individual instruments without alteration thereof. In the event that the glass cover is of other configuration than a disc like member, it is obvious that the disc-like member 25 may be conformed to the shape of the glass cover which is replaced.

Figure 6:
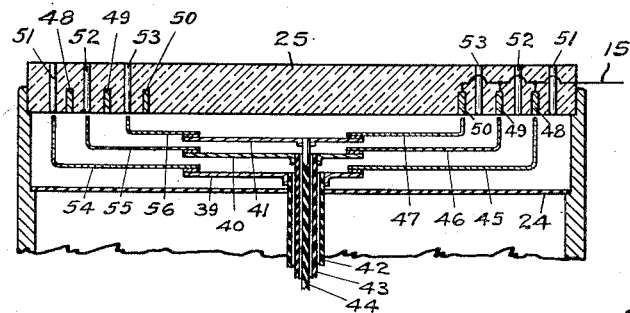
Fig. 6 is a sectional view taken substantially on broken line 6—6 of Fig. 5 and wherein the positions of the hands or needles have been changed for purposes of clearness in drafting.

Referring to Figs. 5 and 6, the parts similar to the parts shown in Figs. 1, 2 and 3 are similarly numbered, and in the interest of brevity of description only the parts which are dissimilar will be specifically described. Also in said figures, the recorders 29 to be used are not illustrated as they may follow the form thereof shown in Fig. 1. In said Figs. 5 and 6, a plurality of needles 39, 40 and 41 are shown rather than single needle 18 or 20—22 of the previous figures. Each of these needles 39 to 41 inclusive has its respective operating shaft 42 to 44 inclusive, which are respectively connected to the desired motivating structure depending upon the nature and type of the instrument. In view of the well known character of multi-reading instruments to indicate by separate needles on a common dial face different information, no particular actuating means for the shafts 42 to 44 inclusive is illustrated. The shafts 42 to 44 inclusive are preferably formed of insulating material and the needles 39 to 41 inclusive are metallic. Obviously structure shown in Fig. 4 may be adapted to the instrument shown in Figs. 5 and 6 to provide an insulated metallic needle for each of the needles 39 to 41 inclusive in a multi-reading instrument. Each of the needles 39 to 41 inclusive is provided with conductors as extensions 45 to 47 inclusive to provide a plurality of metallic members, each having an end portion traveling in a circular path in close spaced relation respectively to an annular ring 48 to 50 inclusive. A plurality of electrodes are disposed to form three concentric circles, wherein the electrodes in one circle are numbered 51, another 52, and the third 53. The electrodes 51 to 53 inclusive are similar to electrodes 26 of Figs. 1 and 2 and the number to be employed will be determined similarly to such electrodes 26 of Figs. 1 and 2. The annular concentric rings 48, 49 and 50 may be flush with the lower side of disc-like member 25 and the extensions 45 to 47 inclusive extend upwardly, as shown, in close spaced relation thereto. All air gaps, provided by the close relation of parts, provided in the device of Figs. 5 and 6 will be in the nature of those described in connection with Figs. 1 to 4 inclusive. The rings 48, 49 and 50 are connected to a source or individually to separate sources of energy, and are shown by way of example connected to a single source with the same electrically interconnected and connected with the conductor 15. Extensions 54 to 56 are provided on needles 39 to 41 on the end portions opposed to extensions 45 to 47. These extensions 54, 55 and 56 provide metallic members each having an end portion traveling in a circular path in close spaced relation respectively to a circular group of electrodes 51, 52 and 53. Individual conductors 57 connect with electrodes 51, conductors 58 with electrodes 52, and conductors 59 with electrodes 53. The conductors 57 connect the individual electrodes 51 with a recorder 29 similarly to the conductors 27 of Figure 1, and likewise the conductors 58 and 59 connect electrodes 49 and 50 with recorders. As previously noted in the short figure description hereinbefore, the position of the needles 39, 40 and 41 in Fig. 5 is not the same as that shown in Fig. 6 in the interest of drafting clarity.

The mode of operation of the structure shown in Figs. 5 and 6 may be readily traced, as energy from conductor 15 will pass to the rings 48 to 50 inclusive, to the extensions 45 to 47 inclusive, to the needles 39 to 41 inclusive, to extensions 54 to 56 inclusive, to one electrode of each group 51 to 53, inclusive, and thence to one conductor of each group 57 to 59 inclusive. The energy on a conductor 57 to 59 inclusive will pass through a recorder 29, similarly to the energy on a conductor 27 of Fig. 1, thence through a source of energy, as spark coil 11—12—13—14 of Figure 1, and thence to conductor 15. Three separate recorders 29 or a single recorder 29 having sufficient electrodes may be employed. This will provide for multi-graphs from a multi-recording meter.

Obviously the disc like member 25 of the various figures may be on one side or the other of the plane of travel of the recording needle but it is preferably in the position illustrated so that any instrument may be adapted to this invention rather than being specifically originally built in accordance therewith.

Obviously, changes may be made in the forms, dimensions, and arrangement of the parts of my invention, without departing from the principle thereof, the above setting forth only preferred forms of embodiment.

I claim:

1. In recording apparatus, a plurality of superposed concentric rotatable recording needles, each operatively connected to its rotating means and each having end portions describing concentric circles of different diameter and with both circles of one needle radially spaced as respects the circles of the adjacent needle; a face member formed of insulating material; a set of electrodes for one end portion of each recording needle, each set comprising a plurality of electrodes carried by said face member and positioned in a circular path similar to and in relatively close spaced relation to the circle described by one end portion of a needle of the recording needles, whereby is formed an air gap between one end portion of a recording needle and an electrode of said plurality of electrodes when said end portion of said recording needle is in juxtaposed relation thereto; an electrode for the other end portion of each recording needle comprising annular electrode means similar to and positioned in relatively close spaced relation to the circle described by the other end portion of the needle, whereby is formed an air gap between said annular electrode means and said other end portion of a recording needle; means providing a source of high voltage and low amperage E. M. F.; and a plurality of circuit means for said E. M. F. each including therein an annular electrode means for a recording needle, the air gap between said annular electrode means and the said recording needle, the said recording needle, said air gap between the said needle and one of said plurality of electrodes, and one of said plurality of electrodes.

2. In recording apparatus, a plurality of superposed concentric rotatable recording needles, each operatively connected to its rotating means and each having end portions disposed at right angles to the needles and describing concentric circles of different diameter and with the right angle end portions of a needle telescopingly positioned relatively to the right angle end portions of the next adjacent needle; a face member formed of insulating material; a set of electrodes for one end portion of each recording needle, each set comprising a plurality of electrodes carried by said face member and positioned in a circular path similar to and in relatively close spaced relation to the circle described by one end portion of a needle of the recording needles, whereby is formed an air gap between one end portion of a recording needle and an electrode of said plurality of electrodes when said end portion of said recording needle is in juxtaposed relation thereto; an electrode for the other end portion of each recording needle comprising annular electrode means similar to and positioned in relatively close spaced relation to the circle described by the other end portion of the needle, whereby is formed an air gap between said annular electrode means and said other end portion of a recording needle; means providing a source of high voltage and low amperage E. M. F.; and a plurality of circuit means for said E. M. F. each including therein an annular electrode means for a recording needle, the air gap between said annular electrode means and the said recording needle, the said recording needle, said air gap between the said needle and one of said plurality of electrodes, and one of said plurality of electrodes.

ORIN B. JOHNSTON.